United States Patent
Ueno (10) Patent No.: US 12,528,243 B2
(45) Date of Patent: Jan. 20, 2026

(54) IMPRINT APPARATUS, IMPRINT METHOD AND ARTICLE MANUFACTURING METHOD

(71) Applicant: CANON KABUSHIKI KAISHA, Tokyo (JP)

(72) Inventor: Takehiko Ueno, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 133 days.

(21) Appl. No.: 18/194,942

(22) Filed: Apr. 3, 2023

(65) Prior Publication Data

US 2023/0321895 A1 Oct. 12, 2023

(30) Foreign Application Priority Data

Apr. 12, 2022 (JP) ................................. 2022-065857

(51) Int. Cl.
  *B29C 59/00* (2006.01)
  *B29C 59/02* (2006.01)

(52) U.S. Cl.
  CPC .......... *B29C 59/002* (2013.01); *B29C 59/022* (2013.01); *B29C 59/026* (2013.01)

(58) Field of Classification Search
  CPC .... B29C 59/002; B29C 59/022; B29C 59/026
  USPC ...................................................... 264/40.1
  See application file for complete search history.

(56) References Cited

U.S. PATENT DOCUMENTS

| 10,627,715 | B2 | 4/2020 | Choi |
| 11,161,280 | B2 | 11/2021 | Khusnatdinov et al. |
| 2019/0310547 | A1* | 10/2019 | Kondo ................. G03F 7/0002 |

FOREIGN PATENT DOCUMENTS

| JP | 2006303292 A | 11/2006 |
| JP | 2012094818 A | 5/2012 |
| JP | 2012099790 A | 5/2012 |
| JP | 5728602 B2 | 6/2015 |
| JP | 2017126723 A | 7/2017 |
| JP | 2018074159 A | 5/2018 |
| JP | 2018088472 A | 6/2018 |

(Continued)

OTHER PUBLICATIONS

English translation of KR20190003391 (Year: 2019).*

*Primary Examiner* — Christina A Johnson
*Assistant Examiner* — Xue H Liu
(74) *Attorney, Agent, or Firm* — ROSSI, KIMMS & McDOWELL LLP (57) ABSTRACT

An imprint apparatus including a mold deformation mechanism configured to deform a mold by applying a pressure to the mold, a substrate deformation mechanism configured to deform the substrate by applying a pressure to the substrate, a measurement unit configured to measure a deformation amount of the mold and a deformation amount of the substrate during separating the mold from the cured imprint material on the substrate, and a control unit configured to control, during the separating, a pressure to be applied to the mold by the mold deformation mechanism and a pressure to be applied to the substrate by the substrate deformation mechanism based on the deformation amounts measured by the measurement unit such that a difference between the deformation amount of the mold and the deformation amount of the substrate falls within an allowable range.

10 Claims, 6 Drawing Sheets

(56) References Cited

FOREIGN PATENT DOCUMENTS

| | | | |
|---|---|---|---|
| JP | 2020068338 A | 4/2020 | |
| KR | 1020180048367 A | 5/2018 | |
| KR | 1020180060992 A | 6/2018 | |
| KR | 20190003391 A * | 1/2019 | ......... G03F 7/70508 |

\* cited by examiner

IMPRINT APPARATUS, IMPRINT METHOD AND ARTICLE MANUFACTURING METHOD

BACKGROUND OF THE INVENTION

Field of the Invention

The present invention relates to an imprint apparatus, an imprint method and an article manufacturing method.

Description of the Related Art

As a lithography technique for manufacturing a semiconductor device or the like, there is known an imprint technique of molding an imprint material on a substrate using a mold. The imprint technique can form a pattern (projection and groove pattern) of the imprint material on the substrate by curing the imprint material in a state in which the mold and the imprint material on the substrate are in contact with each other, and separating the mold from the cured imprint material.

In an imprint apparatus applied with the imprint technique described above, in general, a step (mold separation step) of separating the mold from the cured imprint material on the substrate is performed by lifting a head holding the mold. Japanese Patent No. 5728602 proposes a technique of matching the thickness of the mold and the thickness of the substrate so as to prevent generation of a nonuniform stress and a distortion in the contact region (imprint material) between the mold and the substrate during the mold separation step. Further, Japanese Patent Laid-Open No. 2018-74159 proposes a technique of decreasing a mold separation force by applying a pressure to each of the back surface of the mold and the back surface of the substrate in accordance with the measurement value of the force (mold separation force) required to separate the mold from the cured imprint material on the substrate.

However, in the mold separation step, if there is a difference between the deformation amount of the mold and the deformation amount of the substrate, a nonuniform stress and a distortion are generated in the contact region between the mold and the substrate, that is, in the pattern of the imprint material on the substrate. This leads to an increase in the number of pattern defects.

SUMMARY OF THE INVENTION

The present invention provides an imprint apparatus advantageous in forming a pattern of an imprint material on a substrate with high accuracy.

According to one aspect of the present invention, there is provided an imprint apparatus that forms a pattern of an imprint material on a substrate using a mold, including a mold deformation mechanism configured to deform the mold into a convex shape toward a side of the substrate by applying a pressure to the mold, a substrate deformation mechanism configured to deform the substrate into a convex shape toward a side of the mold by applying a pressure to the substrate, a measurement unit configured to measure a deformation amount of the mold and a deformation amount of the substrate during separating the mold from the cured imprint material on the substrate, and a control unit configured to control, during the separating, a pressure to be applied to the mold by the mold deformation mechanism and a pressure to be applied to the substrate by the substrate deformation mechanism based on the deformation amounts measured by the measurement unit such that a difference between the deformation amount of the mold and the deformation amount of the substrate falls within an allowable range.

Further aspects of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1:
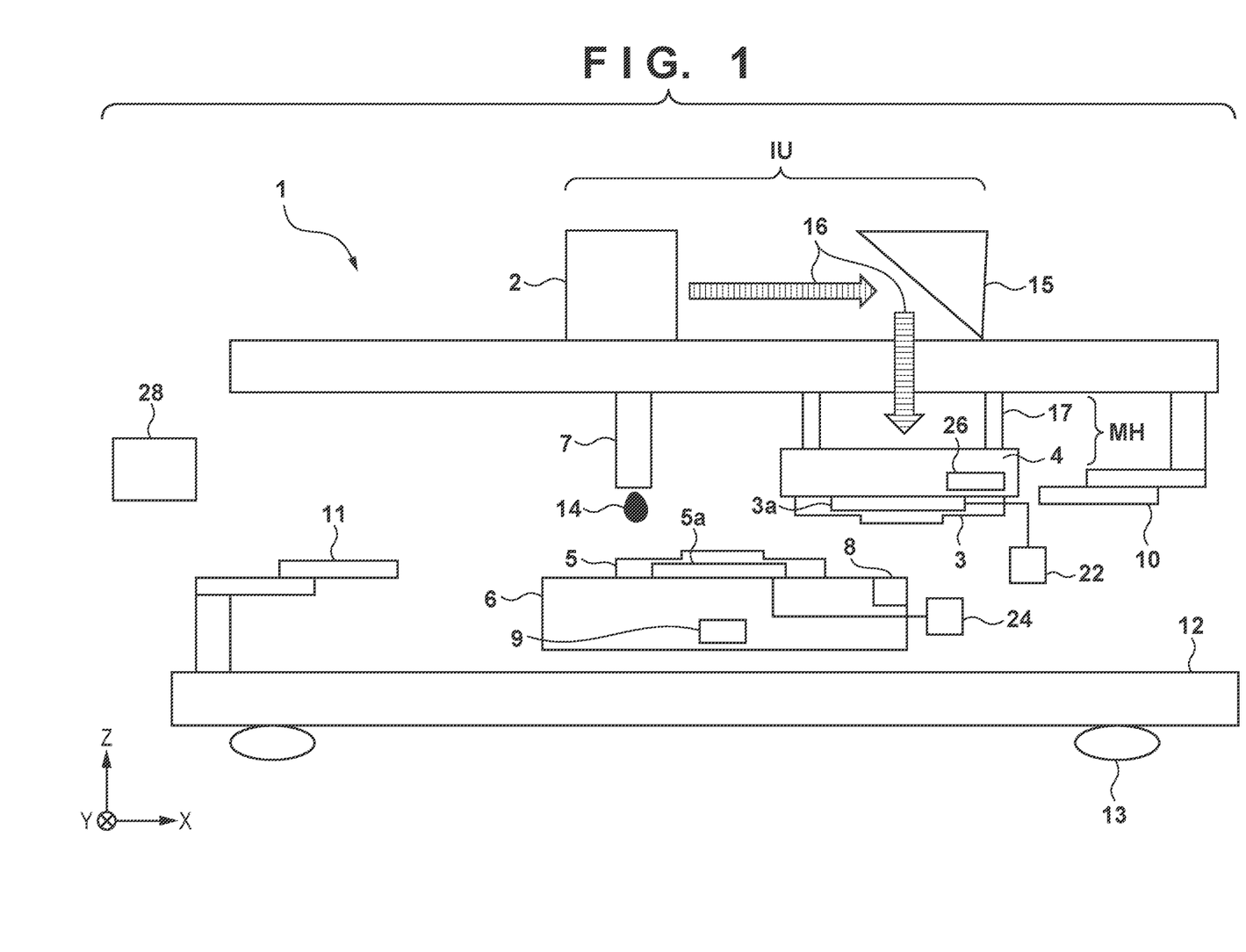
FIG. 1 is a schematic view illustrating configurations of an imprint apparatus according to an aspect of the present invention.

FIG. 1 is a schematic view illustrating configurations of an imprint apparatus 1 according to an aspect of the present invention. The imprint apparatus 1 is a lithography apparatus employed in a lithography step that is a manufacturing step for a device such as a semiconductor element, a liquid crystal display element, or magnetic storage medium as an article to form a pattern on a substrate. The imprint apparatus 1 performs an imprint process for forming a pattern of an imprint material on a substrate using a mold. More specifically, the imprint apparatus 1 brings an uncured imprint material supplied (arranged) on the substrate into contact with the mold, and applies curing energy to the imprint material, thereby forming a pattern of a cured product to which the pattern of the mold is transferred.

As the imprint material, a material (curable composition) to be cured by receiving curing energy is used. An example of the curing energy that is used is electromagnetic waves, heat, or the like. As the electromagnetic waves, for example, infrared light, visible light, ultraviolet light, and the like selected from the wavelength range of 10 nm (inclusive) to 1 mm (inclusive) is used.

The curable composition is a composition cured by light irradiation or heating. The photo-curable composition cured by light irradiation contains at least a polymerizable compound and a photopolymerization initiator, and may contain a nonpolymerizable compound or a solvent, as needed. The nonpolymerizable compound is at least one type of material selected from a group comprising of a sensitizer, a hydrogen donor, an internal mold release agent, a surfactant, an antioxidant, a polymer component, and the like.

The imprint material may be applied in a film shape onto the substrate by a spin coater or a slit coater. The imprint material may be applied, onto the substrate, in a droplet shape or in an island or film shape formed by connecting a plurality of droplets using a liquid injection head. The viscosity (the viscosity at 25° C.) of the imprint material is, for example, 1 mPa·s (inclusive) to 100 mPa·s (inclusive).

As the substrate, glass, ceramic, a metal, a semiconductor, a resin, or the like is used, and a member made of a material different from that of the substrate may be formed on the surface of the substrate, as needed. More specifically, examples of the substrate include a silicon wafer, a semiconductor compound wafer, silica glass, and the like.

In the specification and the accompanying drawings, directions will be indicated on an XYZ coordinate system in which directions parallel to a plane on which the substrate is placed are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively.

In this embodiment, the imprint apparatus 1 employs, as the curing method of the imprint material, a photo-curing method of curing the imprint material by irradiating the imprint material with light. As shown in FIG. 1, the imprint apparatus 1 includes an irradiation unit IU, a mold holding unit MH, a supply unit 7, a mold measurement unit 8, a substrate measurement unit 9, a mold conveyance unit 10, a substrate conveyance unit 11, a mold deformation mechanism 22, a substrate deformation mechanism 24, a load cell 26, and a control unit 28.

In the imprint process, the irradiation unit IU irradiates an imprint material 14 on the substrate with light 16 (for example, ultraviolet light) that cures the imprint material 14. The irradiation unit IU includes, for example, a light source 2 that emits the light 16, and an optical member 15 that adjusts the light emitted from the light source 2 to a state appropriate for the imprint process.

The mold holding unit MH has a function of holding and driving a mold 3, and is also referred to as a head. For example, the mold holding unit MH includes a mold chuck 4 that holds the mold 3 by chucking (vacuum-chucking or electrostatically attracting) the mold 3, and a driving unit 17 that drives the mold chuck 4 (the mold 3 held by the mold chuck 4). The driving unit 17 includes an actuator and the like, and has a function of driving the mold chuck 4 in the Z direction (vertical direction). The driving unit 17 may also have a function of driving the mold chuck 4 in the X-Y plane (in the horizontal direction) or a function of tilting the mold chuck 4.

A predetermined pattern to be transferred onto the substrate 5 has been formed on the surface of the mold 3 which faces a substrate 5 while the mold 3 is held by the mold holding unit MH. A cavity 3a formed by an engraved concave portion has been formed in the surface of the mold 3 on the opposite side of the surface which faces the substrate 5 while the mold 3 is held by the mold holding unit MH.

The mold deformation mechanism 22 applies a pressure to the mold 3 held by the mold holding unit MH, thereby deforming the mold 3 into a convex shape toward the substrate 5 side. For example, the mold deformation mechanism 22 includes a pressure adjustment unit that adjusts the pressure in the space (sealed space) surrounded by the cavity 3a and a light transmissive member (not shown). By making the pressure in the space surrounded by the cavity 3a and the light transmissive member higher than the outside pressure by the pressure adjustment unit, the mold 3, more specifically, the surface of the mold 3 on the opposite side of the cavity 3a can be deformed into a convex shape toward the substrate 5 side.

A substrate holding unit 6 holds the substrate 5 by chucking (vacuum-chucking or electrostatically attracting) the substrate 5, and drives the substrate 5 in the X-Y plane. In this embodiment, the substrate holding unit 6 drives along a stage base 12 that defines the X-Y plane. Accordingly, the stage base 12 serves as the reference in the Z direction and the reference of the tilt in driving of the substrate holding unit 6 in the X-Y plane. Since the stage base 12 is installed on a floor via a mount 13, the imprint apparatus 1 has a structure that is less susceptible to a vibration from the floor. Note that the substrate holding unit 6 may include a driving mechanism that drives the substrate 5 in the Z direction, or a rotation mechanism that rotates the substrate 5 about the X- and Y-axes.

The substrate deformation mechanism 24 applies a pressure to the substrate 5 held by the substrate holding unit 6, thereby deforming the substrate 5 into a convex shape toward the mold 3 side. In this embodiment, the substrate 5 is a replica substrate for duplicating the master. A cavity 5a formed by an engraved concave portion has been formed in the surface of the substrate 5 on the opposite side of the surface which faces the mold 3 while the substrate 5 is held by the substrate holding unit 6. For example, the substrate deformation mechanism 24 includes a pressure adjustment unit that adjusts the pressure in the space (sealed space) surrounded by the cavity 5a and a sealing member (not shown). By making the pressure in the space surrounded by the cavity 5a and the sealing member higher than the outside pressure by the pressure adjustment unit, the substrate 5, more specifically, the surface of the substrate 5 on the opposite side of the cavity 5a can be deformed into a convex shape toward the mold 3 side.

The mold measurement unit 8 measures the distance to the mold 3 (surface thereof) (the displacement of the surface of the mold 3) held by the mold holding unit MH. In this embodiment, the mold measurement unit 8 is formed by a distance measurement device provided in the substrate holding unit 6, which measures the Z-direction distance between the mold 3 and the mold measurement unit 8. By driving the substrate holding unit 6 provided with the mold measurement unit 8 along the X-Y plane, the mold measurement unit 8 can measure the Z-direction distance between the mold 3 and the mold measurement unit 8 at respective positions (entire surface) on the surface of the mold 3. Accordingly, the mold measurement unit 8 also functions as a measurement unit capable of measuring the shape and deformation amount of the mold 3 (surface thereof). Note that the mold measurement unit 8 is not necessarily provided in the substrate holding unit 6, and may be provided in a mechanism different from the substrate holding unit 6, which can drive the mold measurement unit 8 along the X-Y plane.

The substrate measurement unit 9 is provided below the substrate 5 held by the substrate holding unit 6, and measures the distance to the substrate 5 (surface thereof) (the displacement of the surface of the substrate 5) held by the substrate holding unit 6. The substrate measurement unit 9 is formed by a distance measurement device that measures the Z-direction distance between the substrate 5 and the substrate measurement unit 9. The substrate measurement unit 9 is provided in a mechanism that can drive the substrate measurement unit 9 along the X-Y plane. By driving the mechanism provided with the substrate measurement unit 9 along the X-Y plane, the substrate measurement unit 9 can measure the Z-direction distance between the substrate 5 and the substrate measurement unit 9 at respective positions (entire surface) on the surface of the substrate 5. Accordingly, the substrate measurement unit 9 also functions as a measurement unit (first measurement unit) capable of measuring the shape and deformation amount of the substrate 5 (surface thereof).

The supply unit 7 has a function of supplying (arranging) the imprint material 14 onto the substrate 5. The supply unit 7 includes, for example, a dispenser that discharges the imprint material 14 onto each shot region on the substrate. For a plurality of shot regions on the substrate, the supply unit 7 may individually supply the imprint material 14 onto each shot region, or may collectively supply the imprint material 14 onto some shot regions. Alternatively, the imprint apparatus 1 may not include the supply unit 7, but the substrate 5 onto which the imprint material 14 has been supplied by an apparatus (spin coater or the like) different from the imprint apparatus 1 may be loaded to the imprint apparatus 1.

The mold conveyance unit 10 is a conveyance mechanism that loads the mold 3 to the imprint apparatus 1 from the outside, and unloads the mold 3 from the imprint apparatus 1 to the outside. The substrate conveyance unit 11 is a conveyance mechanism that loads the substrate 5 to the imprint apparatus 1 from the outside, and unloads the substrate 5 from the imprint apparatus 1 to the outside.

The load cell 26 is provided in the mold chuck 4. The load cell 26 has a function of measuring the pressing force (imprint force) of the mold 3 with respect to the imprint material 14 on the substrate. The load cell 26 also has a function of measuring the position of the mold holding unit MH, and functions as a second measurement unit that measures the displacement of the mold holding unit MH.

The control unit 28 is formed from an information processing apparatus (computer) including a CPU, a memory, and the like, and operates the imprint apparatus 1 by comprehensively controlling the respective units of the imprint apparatus 1 in accordance with a program stored in a storage unit. The control unit 28 may be formed integrally with the imprint apparatus 1 (in a common housing), or may be formed separately from the imprint apparatus 1 (in another housing).

In this embodiment, the control unit 28 controls the imprint process and processes concerning the imprint process. Typically, the imprint process includes a supply step, a contact step, a filling step, a curing step, and a mold separation step. The supply step is a step of supplying (arranging) the imprint material 14 onto the substrate. The contact step is a step of bringing the imprint material 14 on the substrate and the mold 3 into contact with each other. The filling step is a step of filling the imprint material 14 into the pattern of the mold 3 in a state in which the imprint material 14 on the substrate and the mold 3 are in contact with each other. The curing step is a step of curing the imprint material 14 in the state in which the imprint material 14 on the substrate and the mold 3 are in contact with each other. The mold separation step is a step of separating the mold 3 from the cured imprint material 14 on the substrate. As will be described later in detail, for example, the control unit 28 controls the pressure applied to the mold 3 by the mold deformation mechanism 22 and the pressure applied to the substrate 5 by the substrate deformation mechanism 24 during the imprint process, particularly, during the mold separation step.

Figure 2:
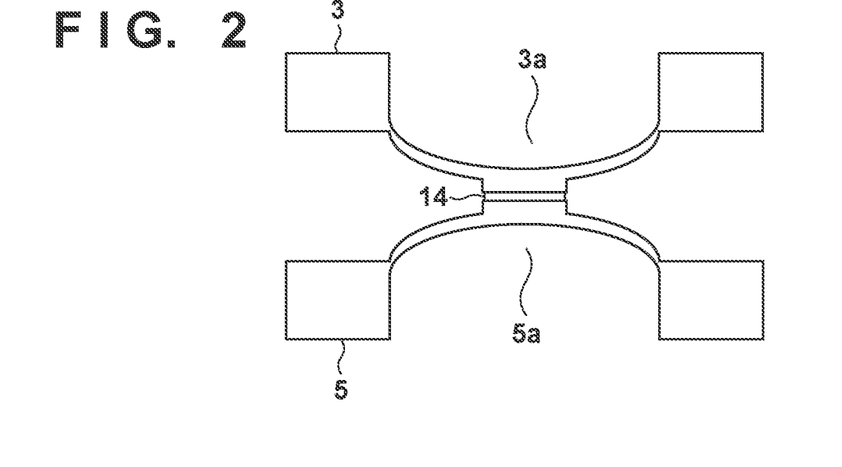
FIG. 2 is a view showing an example of the ideal deformations of a mold and a substrate in a mold separation step.

Here, in the conventional technique, the material and thickness of a portion including the pattern region and its periphery of the mold 3 are equal to those of the substrate 5, and the size (such as the diameter) and the like of the cavity 3a are equal to those of the cavity 5a. With this, as shown in FIG. 2, in the mold separation step of the imprint process, the difference between the deformation amount of the mold 3 and the deformation amount of the substrate 5 is decreased and, ideally, the deformation amount of the mold 3 and the deformation amount of the substrate 5 become equal to each other. In this case, a nonuniform stress and a distortion are not generated in the contact region between the mold 3 and the substrate 5, so that pattern defects of the imprint material 14 formed on the substrate can be reduced. FIG. 2 is a view showing an example of the ideal deformations of the mold 3 and the substrate 5 in the mold separation step.

However, there is a case in which, due to a change in design value or a manufacturing error of the mold 3 or the substrate 5, the material or thickness of the mold 3 does not match that of the substrate 5, or the size or the like of the cavity 3a does not match that of the cavity 5a. In this case, the deformation amount of the mold 3 becomes different from the deformation amount of the substrate 5 in the mold separation step, so that a nonuniform stress and a deformation are generated in the contact region between the mold 3 and the substrate 5. This leads to an increase of pattern defects of the imprint material 14 formed on the substrate.

To prevent this, this embodiment provides a technique for, even if there is a change in design value or a manufacturing error of the mold 3 or the substrate 5, decreasing the difference between the deformation amount of the mold 3 and the deformation amount of the substrate 5 in the mold separation step, thereby suppressing pattern defects of the imprint material 14 formed on the substrate. More specifically, during the mold separation step, the pressure to be applied to the mold 3 (cavity 3a thereof) by the mold deformation mechanism 22 and the pressure to be applied to the substrate 5 (cavity 5a thereof) by the substrate deformation mechanism 24 are controlled so as to make the difference between the deformation amount of the mold 3 and the deformation amount of the substrate 5 fall within an allowable range.

Figure 3:
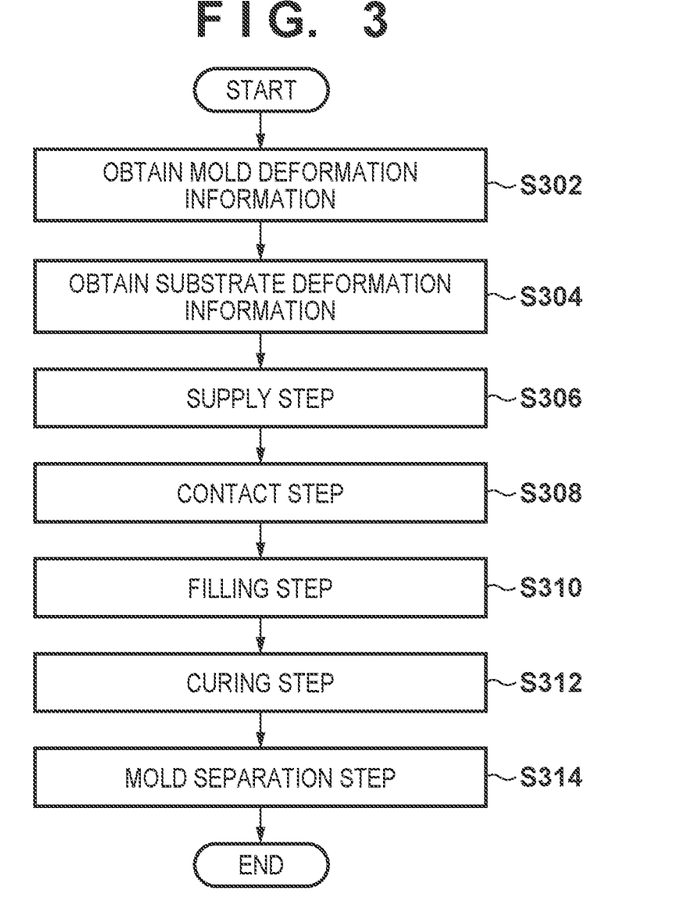
FIG. 3 is a flowchart for describing an imprint process.

With reference to FIG. 3, an imprint process (imprint method) in this embodiment will be described. This imprint process is performed by the control unit 28 comprehensively controlling the respective units of the imprint apparatus 1 as has been described above.

Figure 4:
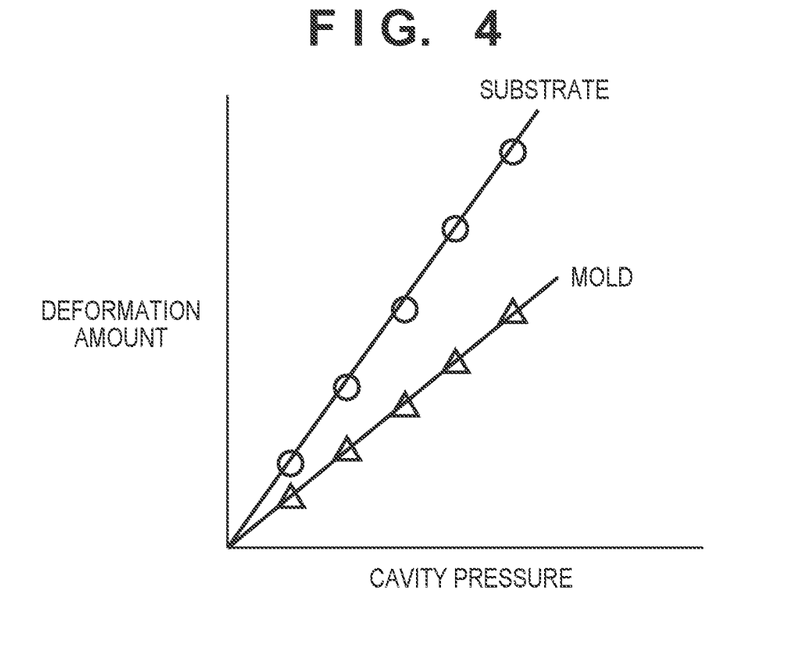
FIG. 4 is a graph showing an example of mold deformation information and substrate deformation information.

In step S302, mold deformation information indicating the relationship between the pressure applied to the mold 3 by the mold deformation mechanism 22 and the deformation amount of the mold 3 is obtained. More specifically, while changing the pressure applied to the cavity 3a of the mold 3 by the mold deformation mechanism 22 (that is, while applying a plurality of pressure values to the cavity 3a), the mold measurement unit 8 measures the Z-direction distance between the mold 3 and the mold measurement unit 8 at respective positions on the surface of the mold 3. With this, as shown in FIG. 4, mold deformation information indicating the relationship between the pressure (cavity pressure) applied to the mold 3 and the deformation amount of the mold 3 is obtained. The mold deformation information obtained in this manner is stored, as a database, in a memory of the control unit 28 or a storage unit included in the imprint apparatus 1.

In step S304, substrate deformation information indicating the relationship between the pressure applied to the substrate 5 by the substrate deformation mechanism 24 and the deformation amount of the substrate 5 is obtained. More specifically, while changing the pressure applied to the cavity 5a of the substrate 5 by the substrate deformation mechanism 24 (that is, while applying a plurality of pressure values to the cavity 5a), the substrate measurement unit 9 measures the Z-direction distance between the substrate 5 and the substrate measurement unit 9 at respective positions on the surface of the substrate 5. With this, as shown in FIG. 4, substrate deformation information indicating the relationship between the pressure (cavity pressure) applied to the substrate 5 and the deformation amount of the substrate 5 is obtained. The substrate deformation information obtained in this manner is stored, as a database, in the memory of the control unit 28 or the storage unit included in the imprint apparatus 1.

In this embodiment, it is assumed that steps S302 and S304 are performed after the imprint process is started and before the supply step of supplying the imprint material 14 onto the substrate and the contact step of bringing the imprint material 14 on the substrate and the mold 3 into contact with each other. However, the mold deformation information and the substrate deformation information may be obtained in advance and stored in the memory of the control unit 28 or the storage unit included in the imprint apparatus 1 before the imprint process is started. Note that in this embodiment, the control unit 28 functions as an obtainment unit that obtains the mold deformation information and the substrate deformation information.

In step S306, the supply step of supplying the imprint material 14 onto the substrate is performed. More specifically, the imprint material 14 is supplied from the supply unit 7 onto the shot region (the target shot region to which the imprint process is to be performed) on the substrate. However, if the imprint material 14 has been collectively supplied onto multiple shot regions including the target shot region on the substrate, this step (S306) is unnecessary. Also, if the imprint material 14 has been supplied onto the target shot region on the substrate by an apparatus different from the imprint apparatus 1, this step (S306) is unnecessary.

In step S308, the contact step of bringing the mold 3 and the imprint material 14 on the substrate into contact with each other is performed. More specifically, in a state in which the mold deformation mechanism 22 and the substrate deformation mechanism 24 apply cavity pressures to the mold 3 and the substrate 5, respectively, so that each of the mold 3 and the substrate 5 are deformed into a convex shape toward the side of each other, the mold 3 and the imprint material 14 on the substrate are brought into contact with each other. Then, the cavity pressures applied to the mold 3 and the substrate 5 by the mold deformation mechanism 22 and the substrate deformation mechanism 24, respectively, are gradually decreased to bring the entire surface of the mold 3 into contact with the imprint material 14 on the substrate.

In step S310, in the state in which the imprint material 14 on the substrate and the mold 3 are in contact with each other, the filling step of filling the imprint material 14 into the pattern of the mold 3 is performed. More specifically, the state in which the entire surface of the mold 3 is in contact with the imprint material 14 on the substrate is maintained until the imprint material 14 is filled into the pattern of the mold 3.

In step S312, the curing step of curing the imprint material 14 on the substrate is performed. More specifically, in the state in which the imprint material 14 on the substrate and the mold 3 are in contact with each other, the irradiation unit IU emits the light 16 to the imprint material 14 to cure the imprint material 14 on the substrate.

In step S314, the mold separation step of separating the mold 3 from the cured imprint material 14 on the substrate is performed. With this, the pattern of the cured imprint material 14 is formed on the substrate.

Figure 5:
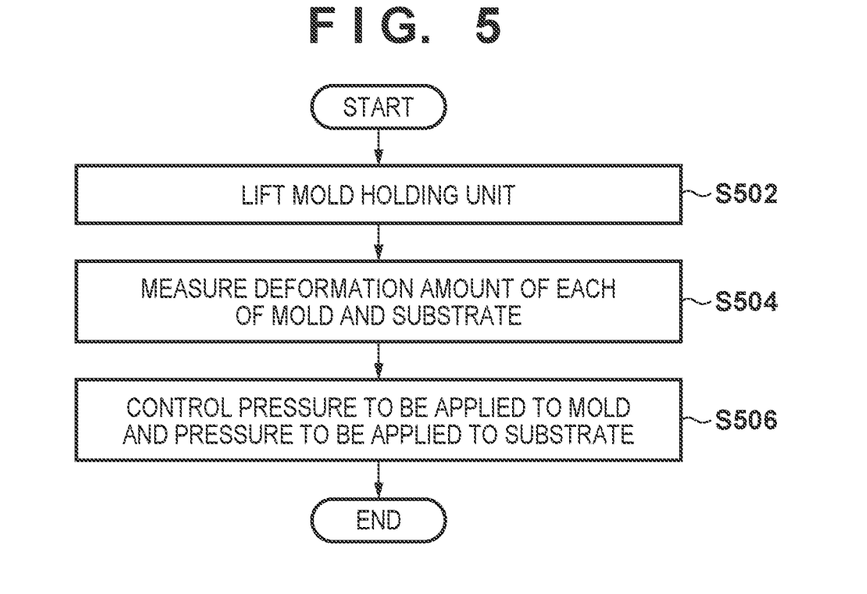
FIG. 5 is a flowchart for describing the mold separation step in this embodiment in detail.

With reference to FIG. 5, the mold separation step in this embodiment will be described below in detail. FIG. 5 is a flowchart for describing the mold separation step (S314) in this embodiment in detail.

In step S502, the mold holding unit MH holding the mold 3 is lifted to separate the mold 3 from the cured imprint material 14 on the substrate. By lifting the mold holding unit MH, the mold separation step proceeds while each of the mold 3 and the substrate 5 is deformed into a convex shape toward the respective sides.

In step S504, the deformation amount of each of the mold 3 and the substrate 5 is measured. In this embodiment, the deformation amount of the substrate 5 is obtained by the substrate measurement unit 9 measuring the Z-direction distance between the substrate 5 and the substrate measurement unit 9 (the displacement of the surface of the substrate 5) during the mold separation step. Here, let Z1 be the deformation amount of the substrate 5. In addition, the load cell 26 measures the fluctuation (displacement) of the position of the mold holding unit MH during the mold separation step, that is, the lift amount of the mold holding unit MH (the lift amount of the mold holding unit MH between the time at which the entire surface of the mold 3 comes into contact with the imprint material 14 in the contact step and a given time during the mold separation step). Then, the deformation amount of the mold 3 is obtained from the difference between the lift amount (displacement) of the mold holding unit MH measured by the load cell 26 and the Z-direction distance between the substrate 5 and the substrate measurement unit 9 (the deformation amount of the substrate 5) measured by the substrate measurement unit 9. Here, letting Z be the lift amount (displacement amount) of the mold holding unit MH, a deformation amount Z2 of the mold 3 is obtained by Z-Z1.

In step S506, based on the deformation amounts of the mold 3 and the substrate 5 measured in step S504, the pressure to be applied to the mold 3 by the mold deformation mechanism 22 and the pressure to be applied to the substrate 5 by the substrate deformation mechanism 24 are controlled. In this embodiment, during the mold separation step, the pressure to be applied to the mold 3 by the mold deformation mechanism 22 and the pressure to be applied to the substrate 5 by the substrate deformation mechanism 24 are controlled such that the difference between the deformation amount of the mold 3 and the deformation amount of the substrate 5 falls within the allowable range. Note that, ideally, the pressure applied to the mold 3 by the mold deformation mechanism 22 and the pressure to be applied to the substrate 5 by the substrate deformation mechanism 24 are controlled such that the deformation amount of the mold 3 and the deformation amount of the substrate 5 become equal to each other.

For example, the pressure to be applied to the mold 3 by the mold deformation mechanism 22 is decided based on the deformation amounts of the mold 3 and the substrate 5 measured in step S504 and the mold deformation information obtained in step S302. More specifically, the pressure to be applied to the mold 3 by the mold deformation mechanism 22 is decided such that a deformation with the deformation amount corresponding to the difference between the deformation amount of the mold 3 and the deformation amount of the substrate 5 is generated in the mold 3, and the mold deformation mechanism 22 is controlled so as to apply the decided pressure to the mold 3. Here, a difference ΔZ between the deformation amount Z2 of the mold 3 and the deformation amount Z1 of the substrate 5 is obtained by Z1-Z2. Accordingly, letting A be the tilt of the mold deformation information shown in FIG. 4, the mold deformation mechanism 22 is controlled to apply a pressure expressed by ΔZ/A to the mold 3.

Alternatively, the pressure to be applied to the substrate 5 by the substrate deformation mechanism 24 may be decided based on the deformation amounts of the mold 3 and the substrate 5 measured in step S504 and the substrate deformation information obtained in step S304. More specifically, the pressure to be applied to the substrate 5 by the substrate deformation mechanism 24 is decided such that a deformation with the deformation amount corresponding to the difference between the deformation amount of the mold 3 and the deformation amount of the substrate 5 is generated in the substrate 5, and the substrate deformation mechanism 24 may be controlled so as to apply the decided pressure to the substrate 5. Here, the difference ΔZ between the deformation amount Z2 of the mold 3 and the deformation amount Z1 of the substrate 5 is obtained by Z1-Z2. Accordingly, letting B be the tilt of the substrate deformation information shown in FIG. 4, the substrate deformation mechanism 24 is controlled so as to apply the pressure expressed by ΔZ/B to the substrate 5.

Figure 6:
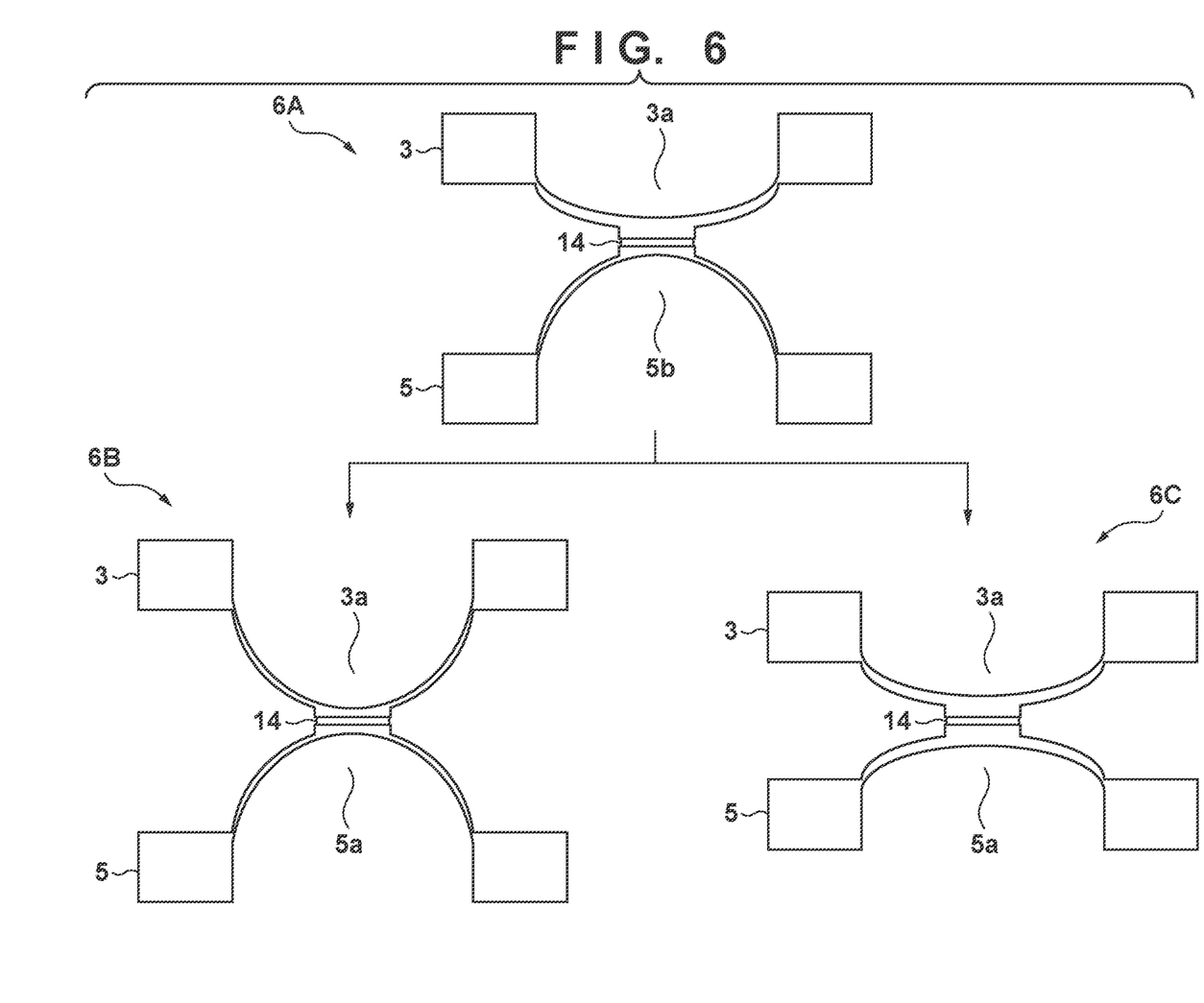
FIG. 6 is a view each showing an example of the deformation of each of the mold and the substrate in the mold separation step.

In this manner, during the mold separation step, controlling the mold deformation mechanism 22 or the substrate deformation mechanism 24 (steps S502 to S506) is repeated such that a deformation with the deformation amount corresponding to the difference between the deformation amount of the mold 3 and the deformation amount of the substrate 5 is generated in either one of the mold 3 and the substrate 5. For example, assume a case in which, in the mold separation step, the deformation amount of the substrate 5 is larger than the deformation amount of the mold 3 as shown in 6A of FIG. 6. In this case, as shown in 6B of FIG. 6, a pressure (positive pressure) is applied to the cavity 3a of the mold 3 by the mold deformation mechanism 22 such that a deformation with the deformation amount corresponding to the difference between the deformation amount of the mold 3 and the deformation amount of the substrate 5 is generated in the mold 3. Alternatively, as shown in 6C of FIG. 6, a pressure (negative pressure) may be applied to the cavity 5a of the substrate 5 by the substrate deformation mechanism 24 such that a deformation with the deformation amount corresponding to the difference between the deformation amount of the mold 3 and the deformation amount of the substrate 5 is generated in the substrate 5. With this, it is possible to decrease the difference between the deformation amount of the mold 3 and the deformation amount of the substrate 5 in the mold separation step to make the difference fall within the allowable range. Accordingly, in this embodiment, in the mold separation step, a nonuniform stress and a distortion are not generated in the contact region between the mold 3 and the substrate 5, so that pattern defects of the imprint material 14 formed on the substrate are suppressed. This is advantageous in forming a pattern of the imprint material 14 with high accuracy.

Here, assume a case in which the thickness of the substrate 5 is significantly small with respect to the thickness of the mold 3. In this case, for example, if it is tried to make the difference between the deformation amount of the mold 3 and the deformation amount of the substrate 5 fall within the allowable range by applying the pressure to the mold 3 by the mold deformation mechanism 22 in the mold separation step, it is necessary to apply a large pressure to the mold 3 (cavity 3a thereof), and the mold 3 may be damaged. In this case, it is preferable to make the difference between the deformation amount of the mold 3 and the deformation amount of the substrate 5 fall within the allowable range not by applying a pressure to either one of the mold 3 and the substrate 5 but by applying pressures to both the mold 3 and the substrate 5.

To achieve this, during the mold separation step (step S506), the mold deformation mechanism 22 and the substrate deformation mechanism 24 are controlled such that both the mold 3 and the substrate 5 are deformed to make the difference between the deformation amount of the mold 3 and the deformation amount of the substrate 5 fall within the allowable range.

For example, the pressures to be applied to the mold 3 and the substrate 5 by the mold deformation mechanism 22 and the substrate deformation mechanism 24, respectively, are decided based on the deformation amounts of the mold 3 and the substrate 5 measured in step S504 and the mold deformation information and the substrate deformation information obtained in steps S302 and S304, respectively. More specifically, the pressure to be applied to the mold 3 by the mold deformation mechanism 22 is decided such that a deformation with the deformation amount corresponding to the difference between the average deformation amount of the deformation amount of the mold 3 and the deformation amount of the substrate 5 and the deformation amount of the mold 3 is generated in the mold 3, and the mold deformation mechanism 22 is controlled so as to apply the decided pressure to the mold 3. Further, the pressure to be applied to the substrate 5 by the substrate deformation mechanism 24 is decided such that a deformation with the deformation amount corresponding to the difference between the average deformation amount of the deformation amount of the mold 3 and the deformation amount of the substrate 5 and the deformation amount of the substrate 5 is generated in the substrate 5, and the substrate deformation mechanism 24 is controlled so as to apply the decided pressure to the substrate 5. In other words, both the mold deformation mechanism 22 and the substrate deformation mechanism 24 are controlled such that the deformation amounts of the mold 3 and the substrate 5 become equal to the average deformation amount of the deformation amount of the mold 3 and the deformation amount of the substrate 5. Here, letting Z3 (=(Z1+Z2)/2) be the average deformation amount of the deformation amount Z2 of the mold 3 and the deformation amount Z1 of the substrate 5, and A be the tilt of the mold deformation information shown in FIG. 4, the mold deformation mechanism 22 is controlled so as to apply a pressure expressed by (Z3−Z2)/A to the mold 3. Further, letting B be the tilt of the substrate deformation information shown in FIG. 4, the substrate deformation mechanism 24 is controlled so as to apply a pressure expressed by (Z3−Z1)/B to the substrate 5.

Figure 7:
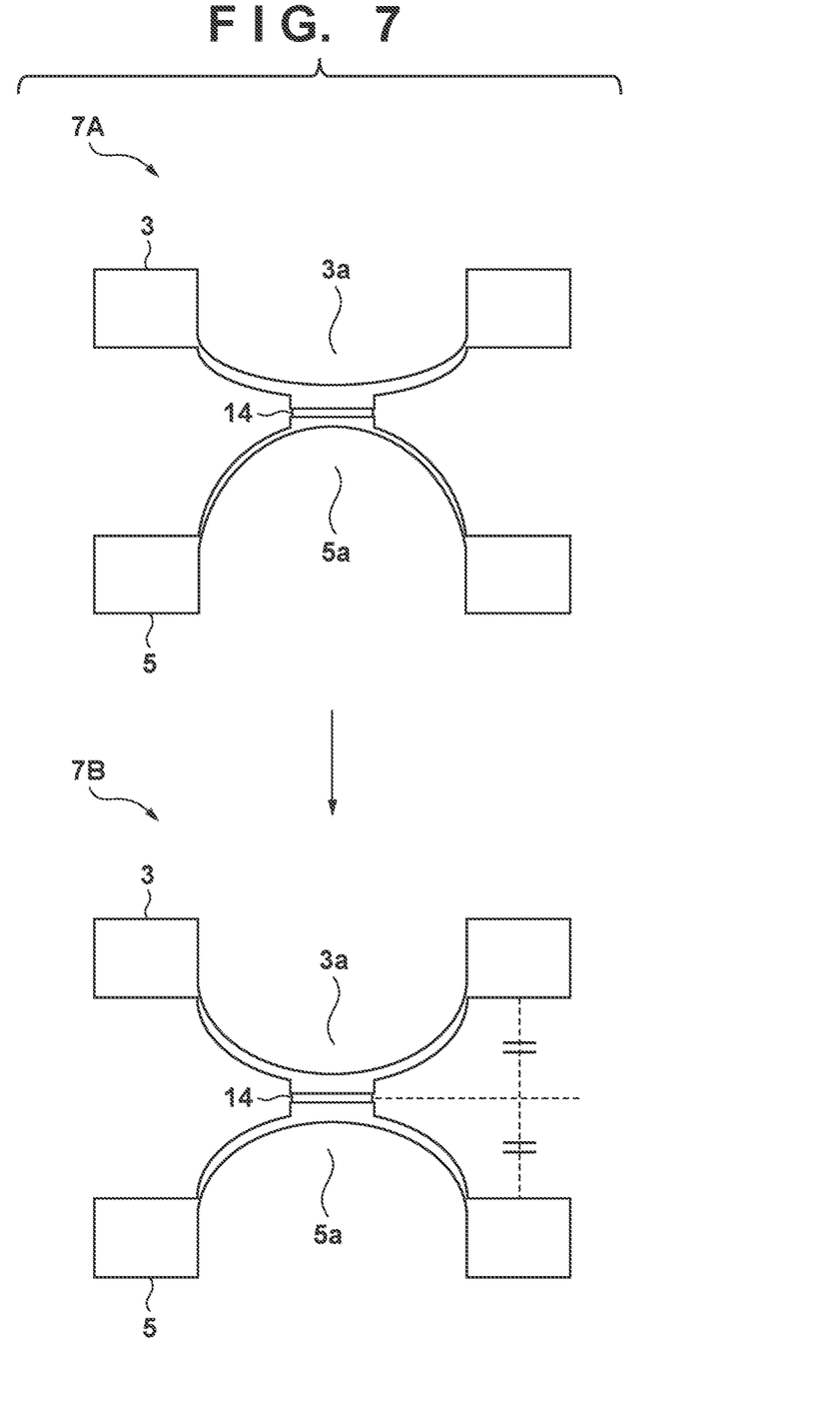
FIG. 7 is a view each showing an example of the deformation of each of the mold and the substrate in the mold separation step.

In this manner, the mold deformation mechanism 22 and the substrate deformation mechanism 24 are controlled such that a deformation with the deformation amount corresponding to the difference between the average deformation amount of the deformation amount of the mold 3 and the deformation amount of the substrate 5 and the deformation amount of corresponding one of the mold 3 and the substrate 5 is generated in each of the mold 3 and the substrate 5. This control is repeated during the mold separation step. For example, assume a case in which, in the mold separation step, the deformation amount of the substrate 5 is larger than the deformation amount of the mold 3 as shown in 7A of FIG. 7. In this case, as shown in 7B of FIG. 7, a pressure (positive pressure) is applied to the cavity 3a of the mold 3 by the mold deformation mechanism 22 such that a deformation with the deformation amount corresponding to the difference between the average deformation amount of the deformation amount of the mold 3 and the deformation amount of the substrate 5 and the deformation amount of the mold 3 is generated in the mold 3. Further, a pressure (negative pressure) is applied to the cavity 5a of the substrate 5 by the substrate deformation mechanism 24 such that a deformation with the deformation amount corresponding to the difference between the average deformation amount of the deformation amount of the mold 3 and the deformation amount of the substrate 5 and the deformation amount of the substrate 5 is generated in the substrate 5. With this, it is possible to decrease the difference between the deformation amount of the mold 3 and the deformation amount of the substrate 5 in the mold separation step to make the difference fall within the allowable range. Accordingly, in the mold separation step, a nonuniform stress and a distortion are not generated in the contact region between the mold 3 and the substrate 5, so that pattern defects of the imprint material 14 formed on the substrate are suppressed. This is advantageous in forming a pattern of the imprint material 14 with high accuracy.

The pattern of a cured product formed using the imprint apparatus 1 is used permanently for at least some of various kinds of articles or temporarily when manufacturing various kinds of articles. The articles are an electric circuit element, an optical element, a MEMS, a recording element, a sensor, a mold, and the like. Examples of the electric circuit element are volatile and nonvolatile semiconductor memories such as a DRAM, a SRAM, a flash memory, and a MRAM and semiconductor elements such as an LSI, a CCD, an image sensor, and an FPGA. Examples of the mold are molds for imprint.

The pattern of the cured product is directly used as the constituent member of at least some of the above-described articles or used temporarily as a resist mask. After etching or ion implantation is performed in the substrate processing step, the resist mask is removed.

Figure 8A:
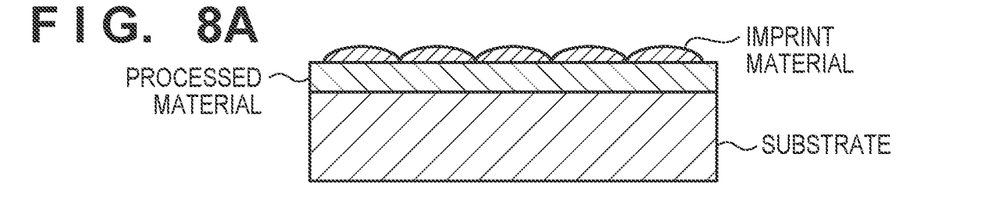
FIGS. 8A to 8F are views for describing an article manufacturing method.

Next, description regarding a detailed method of manufacturing an article is given. As illustrated in FIG. 8A, the substrate such as a silicon wafer with a processed material such as an insulator formed on the surface is prepared. Next, an imprint material is applied to the surface of the processed material by an inkjet method or the like. A state in which the imprint material is applied as a plurality of droplets onto the substrate is shown here.

Figure 8B:
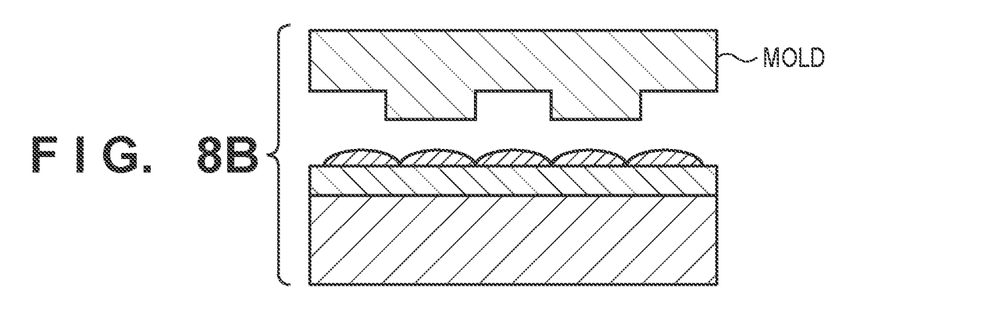
Figure 8C:
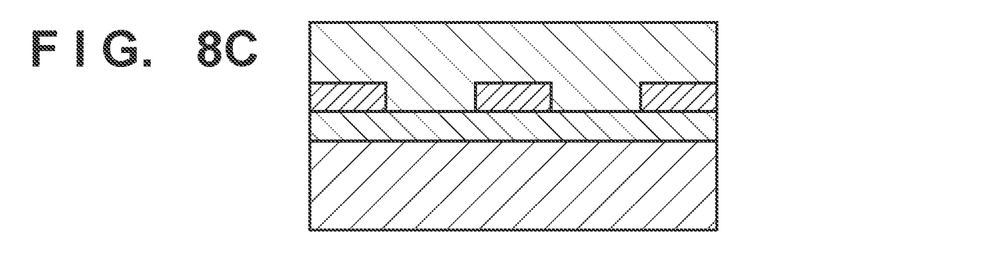

As shown in FIG. 8B, a side of the mold for imprint with a projection and groove pattern is formed on and caused to face the imprint material on the substrate. As illustrated in FIG. 8C, the substrate to which the imprint material is applied is brought into contact with the mold, and a pressure is applied. The gap between the mold and the processed material is filled with the imprint material. In this state, when the imprint material is irradiated with light serving as curing energy through the mold, the imprint material is cured.

Figure 8D:
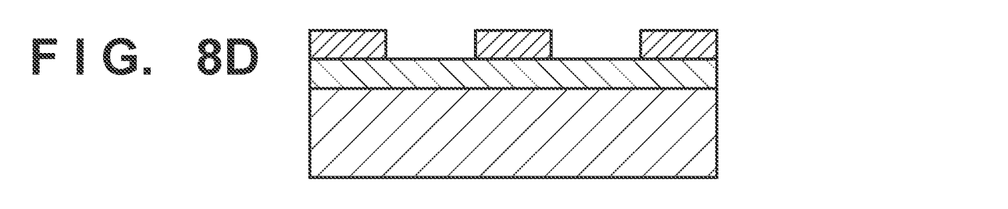

As shown in FIG. 8D, after the imprint material is cured, the mold is released from the substrate. Thus, the pattern of the cured product of the imprint material is formed on the substrate. In the pattern of the cured product, the groove of the mold corresponds to the projection of the cured product, and the projection of the mold corresponds to the groove of the cured product. That is, the projection and groove pattern of the mold is transferred to the imprint material.

Figure 8E:
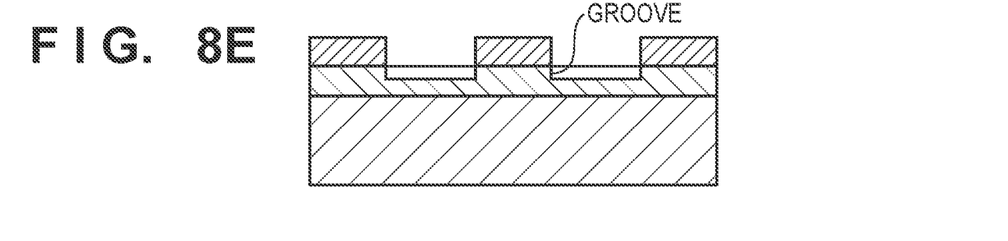
Figure 8F:
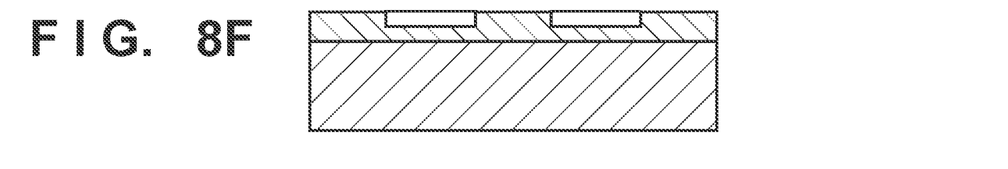

As shown in FIG. 8E, when etching is performed using the pattern of the cured product as an etching resistant mask, a portion of the surface of the processed material where the cured product does not exist or remains thin is removed to form a groove. As shown in FIG. 8F, when the pattern of the cured product is removed, an article with the grooves formed in the surface of the processed material can be obtained. The pattern of the cured material is removed here, but, for example, the pattern may be used as a film for insulation between layers included in a semiconductor element or the like without being removed after processing, in other words as a constituent member of the article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2022-065857 filed on Apr. 12, 2022, which is hereby incorporated by reference herein in its entirety.

What is claimed is:

1. An imprint apparatus that forms a pattern of an imprint material on a substrate using a mold, comprising:
   a mold deformation mechanism configured to deform the mold into a convex shape toward a side of the substrate by applying a pressure to the mold;
   a substrate deformation mechanism configured to deform the substrate into a convex shape toward a side of the mold by applying a pressure to the substrate;
   a measurement unit configured to measure a deformation amount of the mold and a deformation amount of the substrate during separating the mold from the imprint material on the substrate, after bringing the mold and the substrate into contact with each other and curing the imprint material on the substrate; and
   a control unit programmed to control, during the separating, a pressure to be applied to the mold by the mold deformation mechanism and a pressure to be applied to the substrate by the substrate deformation mechanism based on the deformation amounts measured by the measurement unit such that a difference between the deformation amount of the mold and the deformation amount of the substrate falls within an allowable range.

2. The apparatus according to claim 1, wherein
the control unit is further programmed to control, during the separating, the pressure to be applied to the mold by the mold deformation mechanism and the pressure to be applied to the substrate by the substrate deformation mechanism such that the deformation amount of the mold and the deformation amount of the substrate become equal to each other.

3. The apparatus according to claim 1, further comprising
an obtainment unit configured to obtain mold deformation information indicating a relationship between a pressure to be applied to the mold by the mold deformation mechanism and a deformation amount of the mold, and substrate deformation information indicating a relationship between a pressure applied to the substrate by the substrate deformation mechanism and a deformation amount of the substrate,
wherein the control unit is further configured to
decide, based on the deformation amount of the mold and the deformation amount of the substrate measured by the measurement unit and the mold deformation information obtained by the obtainment unit, the pressure to be applied to the mold by the mold deformation mechanism during the separating, and decide, based on the deformation amount of the mold and the deformation amount of the substrate measured by the measurement unit and the substrate deformation information obtained by the obtainment unit, the pressure to be applied to the substrate by the substrate deformation mechanism during the separating.

4. The apparatus according to claim 3, wherein the obtainment unit is further configured to obtain the mold deformation information by measuring the deformation amount of the mold while changing the pressure applied to the mold by the mold deformation mechanism, and obtain the substrate deformation information by measuring the deformation amount of the substrate while changing the pressure applied to the substrate by the substrate deformation mechanism.

5. The apparatus according to claim 3, wherein the control unit is further programmed to control the pressure to be applied to the mold by the mold deformation mechanism such that a deformation with a deformation amount corresponding to a difference between the deformation amount of the mold measured by the measurement unit and the deformation amount of the substrate measured by the measurement unit is generated in the mold.

6. The apparatus according to claim 3, wherein the control unit is further programmed to control the pressure to be applied to the substrate by the substrate deformation mechanism such that a deformation with a deformation amount corresponding to a difference between the deformation amount of the mold measured by the measurement unit and the deformation amount of the substrate measured by the measurement unit is generated in the substrate.

7. The apparatus according to claim 1, wherein the control unit is further programmed to decide the pressure to be applied to the mold by the mold deformation mechanism such that a deformation with a deformation amount corresponding to a difference between an average deformation amount of the deformation amount of the mold measured by the measurement unit and the deformation amount of the substrate measured by the measurement unit and the deformation amount of the mold measured by the measurement unit is generated in the mold, and decide the pressure to be applied to the substrate by the substrate deformation mechanism such that a deformation with a deformation amount corresponding to a difference between the average deformation amount and the deformation amount of the substrate measured by the measurement unit is generated in the substrate.

8. The apparatus according to claim 1, further comprising a mold holding unit configured to hold and drive the mold, wherein the measurement unit includes a first measurement unit provided below the substrate, and configured to measure a displacement of a surface of the substrate, and a second measurement unit configured to measure a displacement of the mold holding unit, and wherein the measurement unit is further configured to obtain the deformation amount of the substrate from the displacement of the surface of the substrate measured by the first measurement unit during the separating, and obtain the deformation amount of the mold from a difference between the displacement of the mold holding unit measured by the second measurement unit during the separating and the displacement of the surface of the substrate measured by the first measurement unit during the separating.

9. An imprint method of forming a pattern of an imprint material on a substrate using a mold, comprising:

measuring a deformation amount of the mold and a deformation amount of the substrate during separating the mold from the imprint material on the substrate, after bringing the mold and the substrate into contact with each other and curing the imprint material on the substrate; and controlling, during the separating, a pressure to be applied to the mold to deform the mold into a convex shape toward a side of the substrate and a pressure to be applied to the substrate to deform the substrate into a convex shape toward a side of the mold based on the deformation amounts measured in the measuring so as to make a difference between the deformation amount of the mold and the deformation amount of the substrate fall within an allowable range.

10. An article manufacturing method comprising:

forming a pattern on a substrate using an imprint method defined in claim 9;

processing the substrate on which the pattern is formed in the forming; and manufacturing an article from the processed substrate.

\* \* \* \* \*